(12) United States Patent
Vivanco et al.

(10) Patent No.: US 11,770,211 B2
(45) Date of Patent: Sep. 26, 2023

(54) CHANGING NETWORK ERROR MITIGATION APPROACHES BASED ON CONNECTION CONDITIONS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Stawiarski, Carpentersville, IL (US)

(73) Assignees: AT&T INTELLECTUAL PROPERTY I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 0 days.

(21) Appl. No.: 17/474,168

(22) Filed: Sep. 14, 2021

(65) Prior Publication Data
US 2023/0082946 A1    Mar. 16, 2023

(51) Int. Cl.
*H04L 1/00*     (2006.01)
*H04W 76/15*    (2018.01)
*H04L 1/20*     (2006.01)
*H04L 1/1607*   (2023.01)
*H04L 1/1867*   (2023.01)

(52) U.S. Cl.
CPC .......... *H04L 1/0076* (2013.01); *H04L 1/1678* (2013.01); *H04L 1/20* (2013.01); *H04W 76/15* (2018.02); *H04L 1/189* (2013.01)

(58) Field of Classification Search
CPC ....... H04L 1/0076; H04L 1/1678; H04L 1/20; H04L 1/189; H04W 76/15
See application file for complete search history.

(56) References Cited

U.S. PATENT DOCUMENTS 5,768,291 A * 6/1998 Kelton .................... H04L 1/206
                                                    714/747
2001/0028684 A1* 10/2001 Chung .................. H04L 1/0058
                                                    375/261

(Continued)

*Primary Examiner* — Jamal Javaid
(74) *Attorney, Agent, or Firm* — Amin, Turocy & Watson, LLP

(57) ABSTRACT

The technologies described herein are generally directed to changing error mitigation protocols used for a connection based on the quality of a network connection in a fifth generation (5G) network or other next generation networks. For example, a method described herein can include determining, by network equipment comprising a processor, that a quality of a connection between a user equipment and a network access point is below a connection quality threshold, with the connection employing a communications protocol using a first error mitigation process, and where the network access point enables respective access to services enabled via a communication network. The method can further include, based on the quality and the first error mitigation process, enabling, by the network equipment, a second error mitigation process of the communications protocol of the connection, the second error mitigation process being different than the first error mitigation process.

20 Claims, 10 Drawing Sheets

(56) References Cited

U.S. PATENT DOCUMENTS

| | | | |
|---|---|---|---|
| 2013/0232397 A1* | 9/2013 | Summerson | H04L 1/0076 714/807 |
| 2017/0187497 A1* | 6/2017 | Walid | H04L 69/16 |
| 2022/0046554 A1* | 2/2022 | Marupaduga | H04W 52/367 |

* cited by examiner

CHANGING NETWORK ERROR MITIGATION APPROACHES BASED ON CONNECTION CONDITIONS

TECHNICAL FIELD

The subject application is related to different approaches to handling error mitigation in networked computer systems and, for example, to changing the network error mitigation approaches used for a connection based on connection quality.

BACKGROUND

As network implementations have continued to increase in size and diversity, approaches to establishing connections by user equipment with different network access points have increased in complexity. In some contemporary implementations, coverage by access points can overlap to a degree that did not occur in older systems. Thus, in some implementations, user equipment can be connected to many different access points, with connections to some combinations of access points offering advantages over other access points.

Problems can occur when the quality of ones of the multiple connections vary due to different characteristics of the access points and signals used, e.g., use of different frequency bands, different placement of antennas, and different output transmitting power. These problems can be aggravated by approaches used to mitigate communication errors between access points and user equipment.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
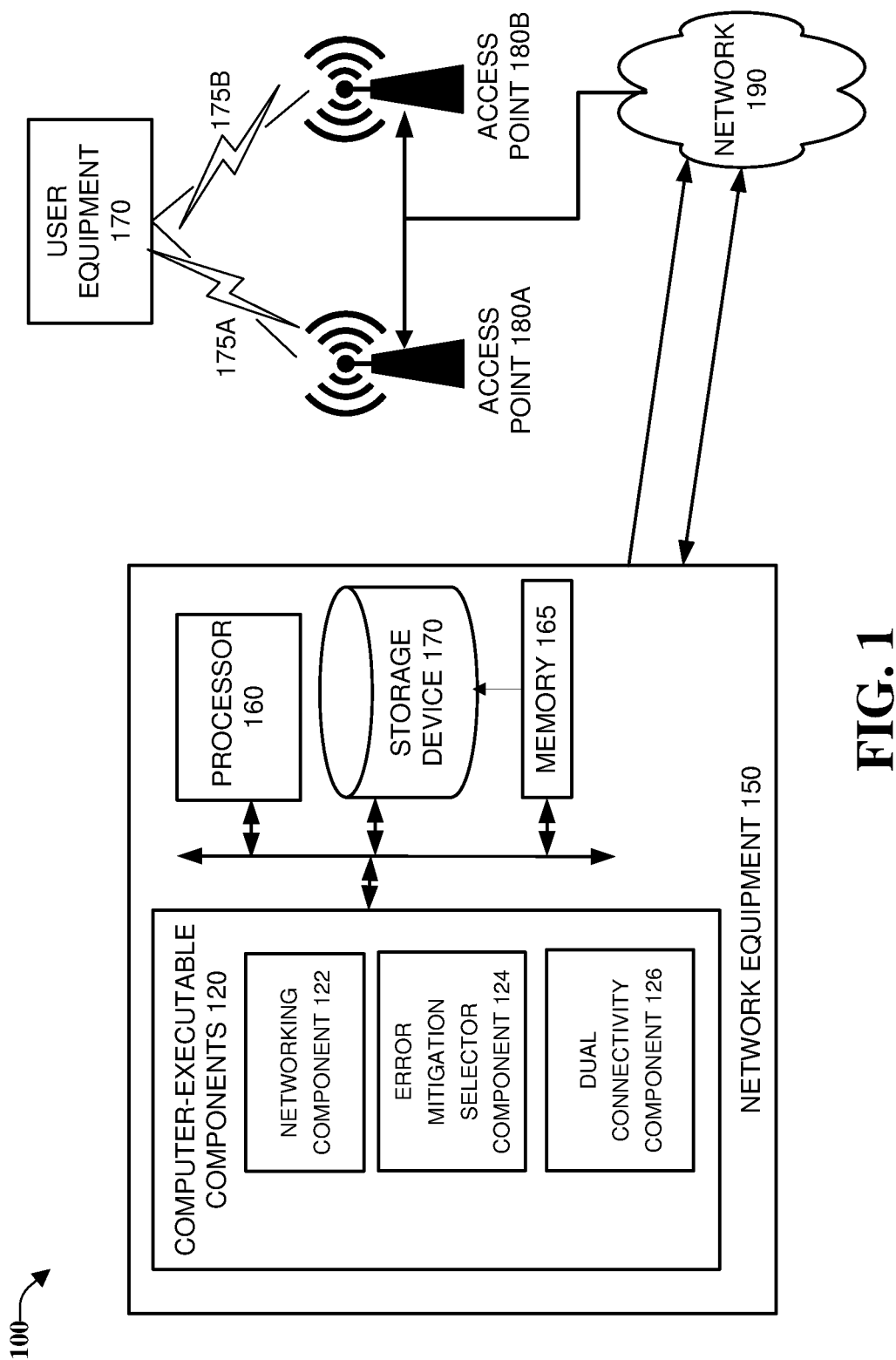
FIG. 1 is an architecture diagram of an example system that can facilitate changing error mitigation protocols used for a connection based on conditions of a network connection, in accordance with one or more embodiments.

Generally speaking, one or more embodiments can facilitate changing error mitigation protocols used for a connection based on conditions of a network connection. In addition, one or more embodiments described herein can be directed towards a multi-connectivity framework that supports the operation of new radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting terms "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., rapidly labeling parts of images based on different criteria), that are not abstract and cannot be performed as a set of mental acts by a human. For example, a human, or even a plurality of humans, cannot efficiently analyze radio link failure events in a communications network (which generally cannot be performed manually by a human) and generate wireless coverage maps, with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate changing error mitigation protocols used for a connection based on conditions of a network connection. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate changing error mitigation protocols used for a connection based on conditions of a network connection, in accordance with one or more embodiments. For purposes of brevity, description of like elements and/or processes employed in other embodiments is omitted. It should be noted that, although many examples herein discuss blocking network connections, given the description herein would appreciate that the approaches can also apply to allocating between more than two RATs.

As depicted, system 100 can include network equipment 150 communicatively coupled to access points 180A-B via network 190. In one or more embodiments, network equipment can include computer executable components 120, processor 160, storage device 162, and memory 165. Computer executable components 120 can include networking component 122, error mitigation selector component 124, dual connectivity component 126, and other components described or suggested by different embodiments described herein, that can improve the operation of system 100. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, network equipment 150 can further comprise various computer and/or computing-based elements described herein with reference to operating environment 1000 and FIG. 10. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining networking component 122. As discussed with FIGS. 4-5 below, networking component 122 can, in accordance with one or more embodiments, determine that a quality of a connection between a user equipment and a network access point is below a connection quality threshold, e.g., when the connection employs a communications protocol comprising a first error mitigation process.

In additional implementations, user equipment 170 has a capability for dual connectivity, with an established primary connection 175A to access point 180A to use the services enabled via communication network 190, and with connection 175B being a secondary connection that was established in accordance with a dual connectivity protocol. In one or more embodiments, primary connection 175A and secondary connection 175B can be established via different radio access technologies (e.g., LTE and NR millimeter wave signal respectively). In one or more embodiments, in accordance with the dual connectivity protocol, primary connection 175A was facilitated by access point 180A as a master (or primary) base station, secondary connection 175B was facilitated by access point 180B as a secondary base station, e.g., at a lower hierarchical level than the master base station.

Further, in another example, in one or more embodiments, computer executable components 120 can include instructions that, when executed by processor 160, can facilitate performance of operations defining error mitigation selector component 124. As discussed with FIGS. 3-4 below, error mitigation selector component 124 can, in accordance with one or more embodiments, based on conditions and the first error mitigation process, enable a second error mitigation process of the communications protocol of the connection, the second error mitigation process being different than the first error mitigation process.

In yet another example, computer executable components 120 can include instructions that, when executed by processor 160, can facilitate performance of operations defining dual connectivity component 126. As discussed herein, dual connectivity component 126 can, in accordance with one or more embodiments, based on measurements collected within the geographic area, designate the geographic area as a blocked geographic area. In alternative or additional embodiments discussed below, dual connectivity component 126 can before establishing the connection, establish a primary connection and a secondary connection to use the services enabled via the communication network.

Figure 2:
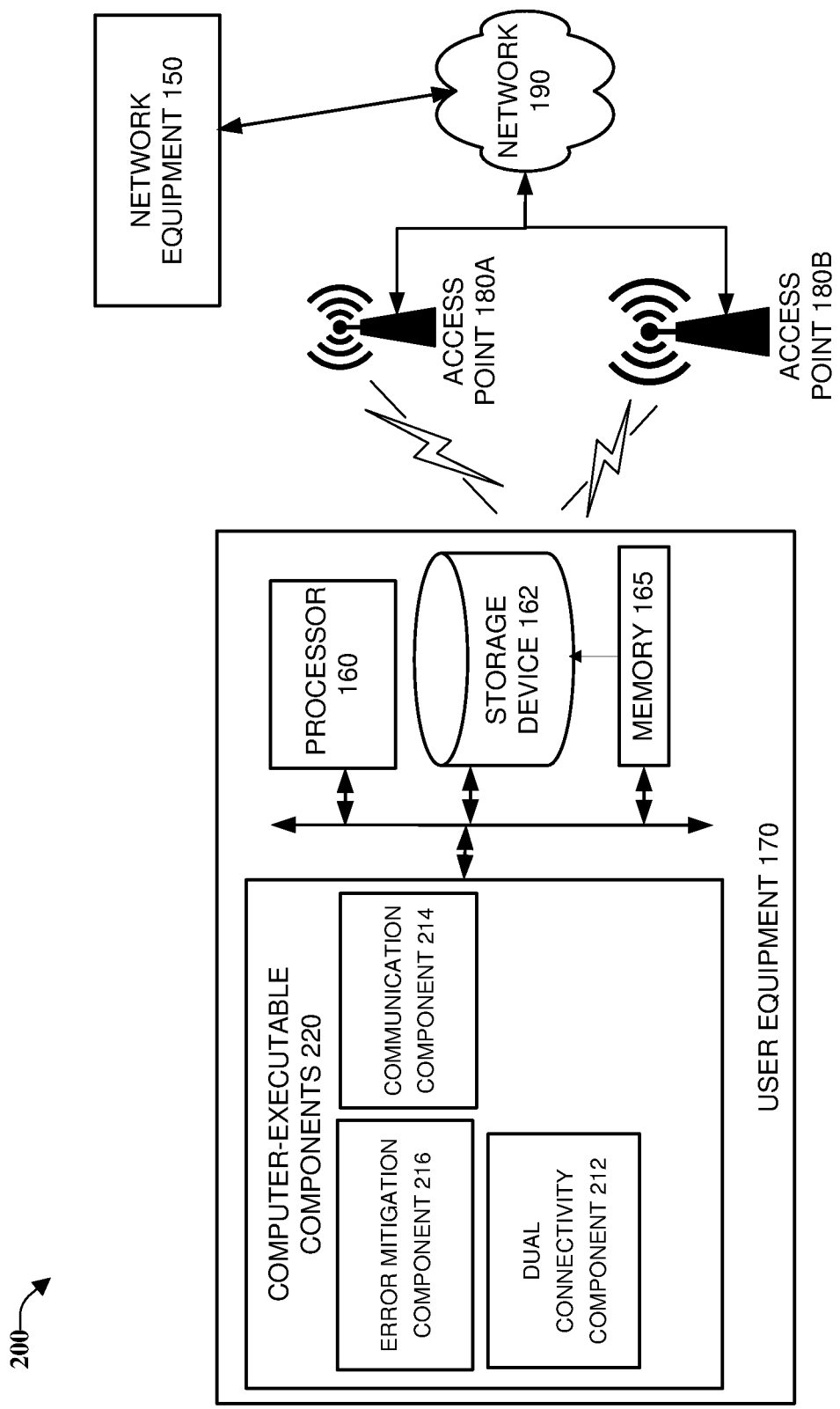
FIG. 2 is a diagram of a non-limiting example system that can facilitate changing error mitigation protocols used for a connection based on conditions of a network connection, in accordance with one or more embodiments.

FIG. 2 is a diagram of a non-limiting example system 200 that can facilitate changing error mitigation protocols used for a connection based on conditions of a network connection, in accordance with one or more embodiments. For purposes of brevity, description of like elements and/or processes employed in other embodiments is omitted.

As depicted, system 200 can include user equipment 170 connected to network equipment 150 via access points 180A-B and network 190. User equipment 170 can include memory 165 that can store one or more computer and/or machine readable, writable, and/or executable components and/or instructions 220 that, when respectively executed by processor 160, can facilitate performance of operations defined by the executable component(s) and/or instruction(s).

Generally, applications (e.g., computer executable components 220) can include routines, programs, components, data structures, etc., that perform particular tasks or implement particular abstract data types. In system 200, computer executable components 220 can include dual connectivity component 212, communication component 214, error mitigation component 216, and other components described or suggested by different embodiments described herein that can improve the operation of system 200. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, user equipment 170 can further comprise various computer and/or computing-based elements described herein with reference to mobile handset 900 of FIG. 9 and operating environment 1000 described with FIG. 10.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 160, can facilitate performance of operations defining dual connectivity component 212. As discussed with FIGS. 4-5 below, in one or more embodiments, dual connectivity component 212 can, in accordance with a dual connectivity protocol, establish a primary connection 175A to first network equipment 150 via primary access point 180A to use services enabled via communication network 190.

In another example, in one or more embodiments, computer executable components 220 can include instructions that, when executed by processor 160, can facilitate performance of operations defining, communication component 214. As discussed with FIGS. 4-5 below, communication component 214 can, in accordance with one or more embodiments, receive the second data packets in accordance with a communications protocol that used first error mitigation that retransmitted unacknowledged packets.

Further, in one or more embodiments, computer executable components 220 can include instructions that, when executed by processor 160, can facilitate performance of operations defining, error mitigation component 216. As discussed with FIGS. 4-5 below, error mitigation component 216 can, in accordance with one or more embodiments, receive the third data packets in accordance with the communications protocol that used the first error mitigation and second error mitigation that did not employ retransmission of the unacknowledged packets, with the second error mitigation being used by the second network equipment based on a quality condition of the secondary connection.

Figure 3:
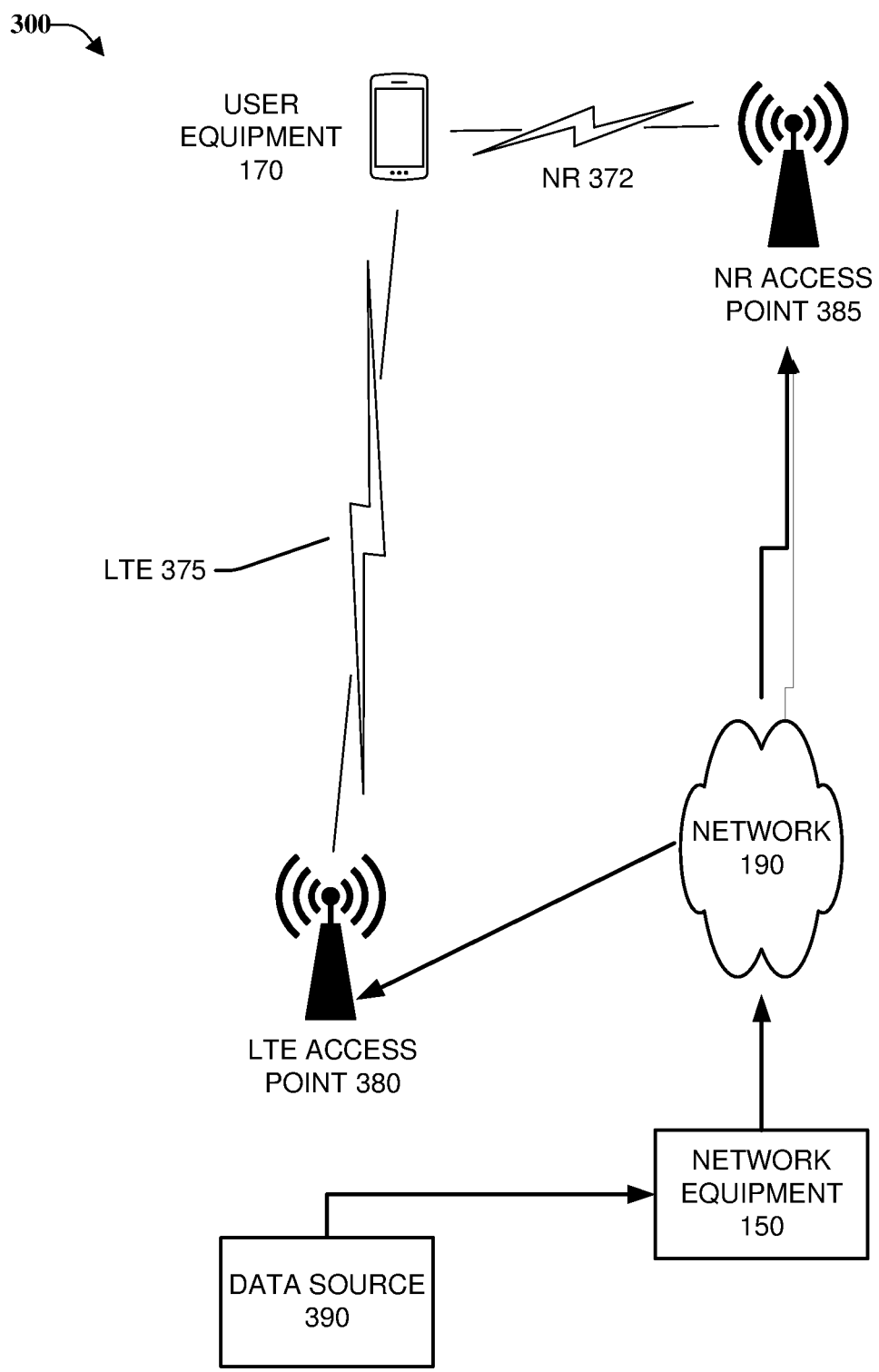
FIG. 3 is a diagram of a non-limiting example system that can facilitate changing error mitigation protocols used for a connection based on conditions of a network connection, in accordance with one or more embodiments.

FIG. 3 is a diagram of a non-limiting example system 300 that can facilitate changing error mitigation protocols used for a connection based on conditions of a network connection, in accordance with one or more embodiments. For purposes of brevity, description of like elements and/or processes employed in other embodiments is omitted. As depicted, system 300 includes LTE access point 380 and NR access point 385, with respective LTE connection 375 and NR connection 372 to user equipment. Network equipment 150 is connected via network 190 to NR access point 385 and LTE access point 380 and can receive TCP encoded communication from data source 390.

In an example, user equipment 170 has a capability for dual connectivity, e.g., with connections able to be established individually or simultaneously using two RATs. In FIG. 3, this dual connectivity is illustrated by primary access point 380 (e.g., LTE connection 360) and secondary (NR) access point 385. With simultaneous connectivity to both primary access point 380 and secondary access point 385 (e.g., typically shorter range and higher bandwidth connections), user equipment 170 can be connected to a core network at up to speeds that are exponentially faster than with a single LTE connection alone. In non-limiting example, the LTE connection can be via megahertz spectrum connections (e.g., various bands withing 700-2300 MHz), and the NR connection can be via gigahertz spectrum connections, e.g., 30-80 GHz.

In an example EN-DC network, primary access point 380 (also termed an MeNB) can configure UE 170 via LTE connection 360. In accordance with an example dual connectivity protocol, UE 170 can detect and establish (or attempt to establish) a secondary connection with a detected secondary access point 385 (also termed an SgMB), e.g., with configuration information from primary access point 380 or another primary access point. This connection can be termed an NR-leg, e.g., a connection to a core network via the secondary (NR) access point 385. In some implementations, after this secondary connection has been established, UE 170 can temporarily cease collecting and relaying wireless condition reports to primary access point 380.

Continuing this non-limiting example implementation of one or more embodiments, user equipment 170 can be used with an evolved terrestrial radio access network (U-TRAN) dual connectivity (EN-DC) system, with the dual connectivity including a primary LTE connection 375 (e.g., via an enhanced node B (eNB)) and secondary NR connection 372. In some implementations, the eNB corresponding LTE access point 380 can be referred to as primary access point to indicate that it is the 'master' (M) base station controlling the 'secondary' (S) 5G NR base station (SgNB), e.g., NR access point 385.

The quality of LTE connection 375 and NR connection 372, functioning in an EN-DC can be independent from each other due to several factors, including, but not limited to, different types of locations generally used for NR access point 385 and LTE access point 380, different frequency bands used, and different output transmitting power. One having skill in the relevant art(s), given the description herein, appreciates that a connection to secondary access point 385 (e.g., a millimeter wave NR connection) can be subject to comprehensively poor RF conditions with rapid onset.

In an example, UE 170 can be receiving a data via TCP from data source 390 through network 190 and LTE connection 375 (e.g., an LTE-leg) from LTE access point 380. Using a dual connectivity approach, based on the availability of a connection to NR access point 385, an NR-leg can be added by UE 170 as an additional way of receiving information. In one or more embodiments, the TCP data from data source 390 can be delivered through both LTE connection 375 and NR connection 372 simultaneously. In some implementations, data source 390, as the TCP Server and UE 170 as the TCP client do not require information describing this simultaneous delivery of the TCP data from data source 390.

Continuing this example, according to TCP, when UE 170 operating in this dual connectivity mode receives a poor NR signal, then TCP-Packets traversing NR connection 372 may not be decoded properly, and this can result in TCP-packet delay or TCP-packet loss, e.g., packets taking the NR-Leg may get corrupted, which may yield to retransmissions for successful decoding of the packets. More particularly, in some circumstances, a TCP stream traversing NR connection 372 with a poor signal may require multiple retransmissions in the MAC-layer (HARM) to overcome corrupted frames, and the resulting TCP-packet delay, can trigger TCP-retransmission and TCP window shrinking. In general, a TCP application can interpret delay/loss as a signal network congestion, and TCP respond by adjustments including but not limited to, forcing TCP retransmission and shrinking TCP window, which can yield to drastic throughput reduction and excessive delays. As described further below, in this dual connectivity example, the adjustments made to TCP parameters based on a poor quality NR connection 372 link, can also be applied to LTE connection 375, e.g., where these adjustments may not be required.

For example, when packets 1-5 of a TCP data stream from data source 390 is split between LTE connection 375 and NR connection 372, packets 1, 2, 3, 5 can be delivered via LTE connection 375 and packet 4 can be delivered via NR connection 372. When NR connection 372 experiences a poor NR-signal, then packet 4 can arrive late or may not arrive at UE 170. In accordance with TCP, in this example, the TCP client, at UE 170, can notify the TCP server at data source 390 about this delay/loss to via TCP-ACK, and this can result in the TCP-Server forcing TCP retransmissions, and shrinking the TCP window, e.g., shrinking throughput significantly.

One or more embodiments can utilize different approaches to address aspects of the problems described above. For example, based on TCP being used, a different error mitigation approach (e.g., other than retransmission) can be utilized for NR connection 372. A non-limiting example error mitigation approach that can be selectively used to handle some or all error mitigation is linear network coding.

Generally speaking, linear network can be coding and decoding that can occur above the physical layer in a packet network. In some circumstances, network coding allows any node in a network to extract the information from one packet, mix it with information from a local cache of packets, and then generate another newly encoded packet to be transmitted to the next hop of the network. To adjust the use of network coding for different circumstances, a redundancy parameter (R) can be selected that can set a level of redundancy applied to the communications, e.g., balancing an overhead cost of redundancy against the benefits in the speed and accuracy of encoded communications.

In an example, for packets arriving at user equipment 170, R linear combinations (linear-network coding) can be created and sent to the IP layer. Based on these linear combinations, after encoding, the encoded packet can contain information from all of the mixed packets. When these encoded packets (e.g., using the second error mitigation approach) are received by a network node (or destination) they can be forwarded them without decoding, or they can be decoded after enough encoded packets have arrived. In some implementations, the decoding of packets can include decoding-information on the packet header that can assist the reconstruction of the original data packets by the decoder.

In some implementations, the compensation factor discussed above can correspond to the redundancy parameter (R), e.g., by increasing the redundancy of the network coding implementation, the level of compensation for delays from the use of the first error mitigation approach can be set. In addition, the level of network encoding employed for a connection described herein can be used to mask the use of network coding from the source of the TCP data.

In one or more embodiments, an (R) compensation factor can be selected that promotes accurate TCP packet delivery, while keeping traffic overhead to the minimum. It should be noted that, in some embodiments R can be updated dynamically based in measurements of ongoing connection characteristics, e.g., when it is estimated that TCP delay/losses from retransmission have increased, then R can be increased to address the increase in delay/losses. Conversely, if TCP delay/losses has decreased, then R can be reduced or linear network coding can be disengaged.

Another, related result of the inefficient retransmission of data described above is the overhead involved in reordering packets received from dual connections, e.g., when problems occur with NR connection 372, packets can arrive later and have to be reordered. To reduce this reordering overhead, when linear network coding is employed to deliver the selected portion of packets (e.g., a portion size selected based on the amount of mitigation needed) lost or late segments can be masked (e.g., to the extent possible) from the TCP implementation by data source 390 and UE 170. In this approach used by one or more embodiments, use of network coding can effectively remove the significance of ordering from a sequence of TCP segments, e.g., if there is no ordering, then there is no need for reordering.

It should be noted that, while many examples discussed herein and FIG. 3 depict one LTE connection 375 and one NR connection 372, these examples are non-limiting and embodiments disclosed and suggested herein can be applied to delay and data loss from any number of connections, compensation can be applied to the overall delay and loss.

It should further be noted that the locations of processing described above (e.g., at network equipment 150 and primary access point 380) are not limiting, with one or more embodiments performing operations at different equipment locations including, but not limited to, monitoring link failure events, determining coverage areas, determining failure event areas, mapping coverages of access points with signal strength measurements. For example, different aspects of approaches described herein can be performed at network equipment 150 being, a central node global control located on the core network (e.g., mobile edge compute (MEC) equipment), self organized network (SON) equipment, or RAN intelligent controller (RIC) equipment.

Figure 4:
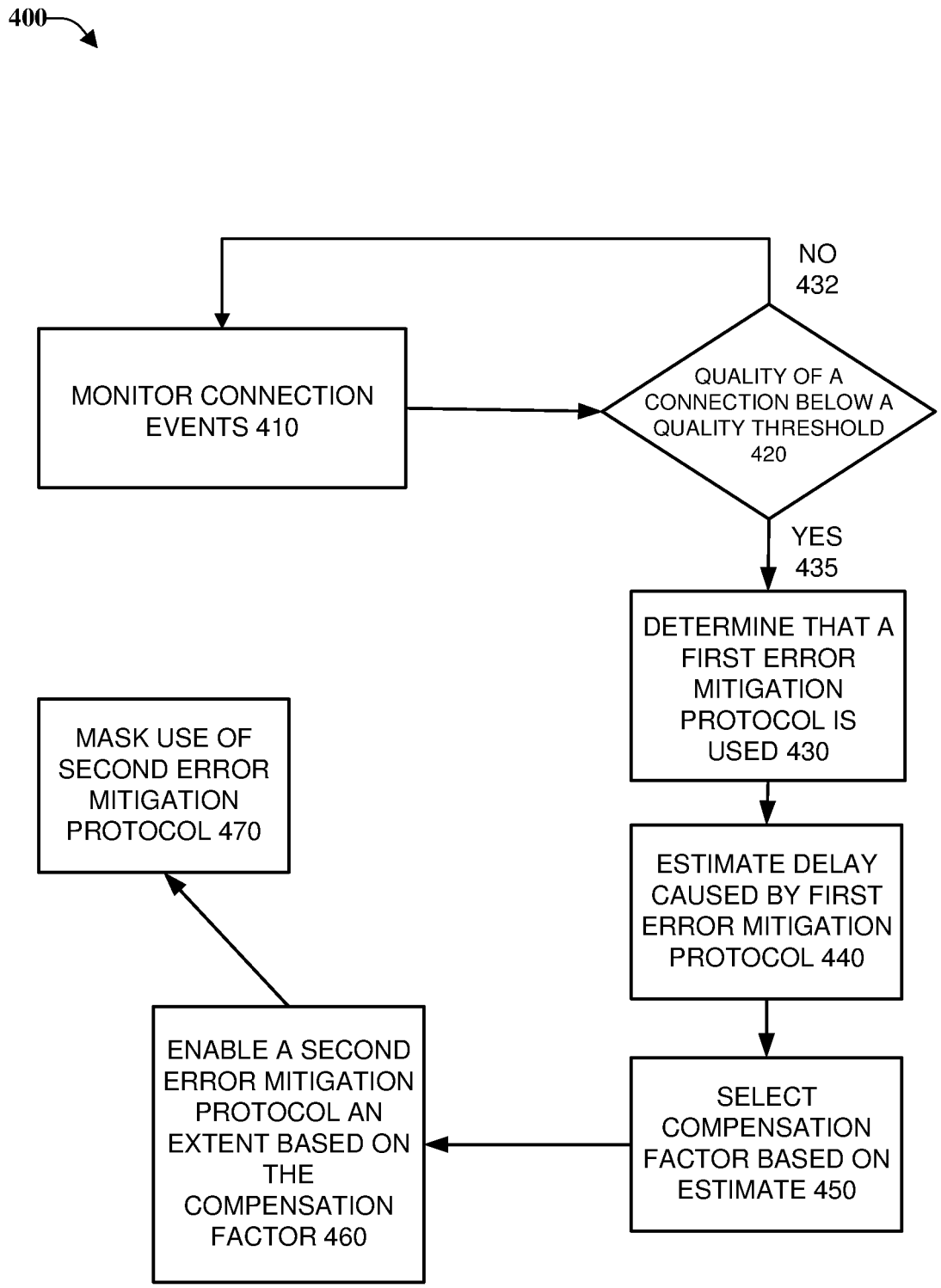
FIG. 4 depicts a flowchart of an example process that can facilitate changing error mitigation protocols used for a connection based on conditions of a network connection, in accordance with one or more embodiments.

To illustrate alternative approaches and results that can be used by one or more embodiments, FIG. 4 describes example approaches that can be employed in accordance with one or more embodiments by network equipment 150, to address circumstances similar to the above-described examples.

FIG. 4 depicts a flowchart of an example process 400 that can facilitate changing error mitigation protocols used for a connection based on conditions of a network connection, in accordance with one or more embodiments. For purposes of brevity, description of like elements and/or processes employed in other embodiments is omitted.

At 410, connection events among different access points can be monitored. In one or more embodiments, the arrangement described with FIG. 3 above can be detected and associated with a threshold amount of problems with one of the two connections, e.g., the NR connection. In some circumstances, the performance of the remaining processes described below can be based on the use of a particular protocol (e.g., TCP/IP) by the simultaneous connections (e.g., NR connection 372 and LTE connection 375) and a type of error correction protocol, e.g., a protocol that remedies unacknowledged packets by retransmission.

At 420, when the monitoring determines that the quality of a connection is below a quality threshold, at 435 operation shifts to 430, where a determination can be made that the communication is using an error mitigation protocol of a particular type, e.g., retransmission of missing or corrupted data. When the monitoring does not detect that the quality of a connection is below a quality threshold, then operation can return to 410.

After the operations of 430, at 440, the delay that will be caused by continuing the use of the first error mitigation protocol can be estimated. For example, in one or more embodiments network equipment 150 can estimate the delay that will be caused by the use of automatic retransmission of unacknowledged packets via NR connection 372. One approach that can be used for this estimate is to analyze hybrid automatic repeat request retransmission data information received from sources including, but not limited to NR access point 385. In other embodiments, another approach that can be used for this estimate is to analyze information associated with the communications protocol received from a source of data of the connection. For example, in one or more embodiments, data source 390 can provide retransmission data for NR connection 375 to network equipment 150 for the estimating. One having skill in the relevant art(s), given the disclosure herein appreciate that different approaches can use current and historical data describing the use of the first error mitigation protocol by different types of connections within the network.

At 450, as descried with FIG. 3 above, a compensation factor (R) can be selected that quantifies the amount of delay caused by the use of the first mitigation protocol. At 460, a second error mitigation protocol can be selected and configured to operate to an extent dictated by the compensation factor, e.g., to the extent the compensation is applied to mitigate the estimated delays caused by use of the first error mitigation protocol. At 470, the use of the second error mitigation protocol can be masked from the source of the data.

Figure 5:
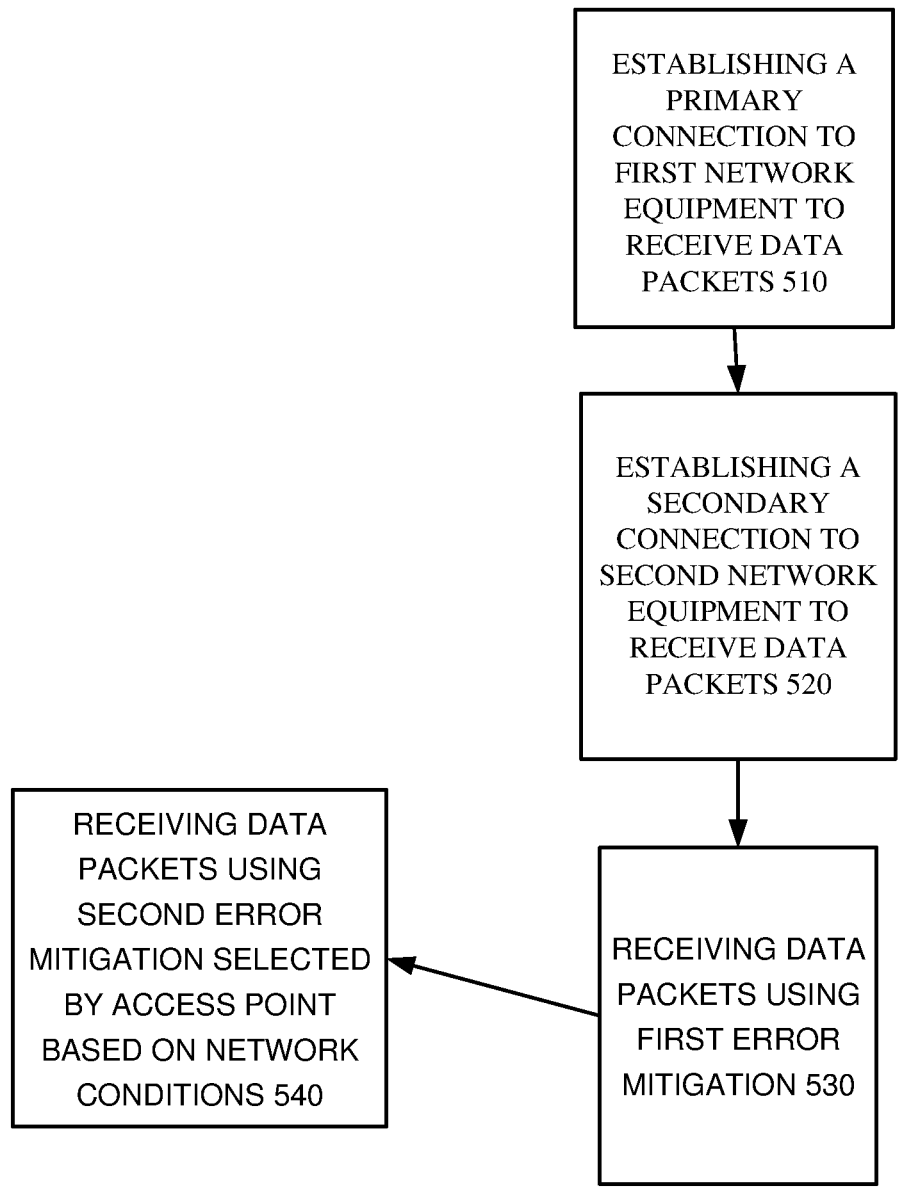
FIG. 5 depicts a flowchart of an example process that can facilitate changing error mitigation protocols used for a connection based on conditions of a network connection, in accordance with one or more embodiments.

FIG. 5 depicts a flowchart of an example process 500 that can facilitate changing error mitigation protocols used for a connection based on conditions of a network connection, in accordance with one or more embodiments. For purposes of brevity, description of like elements and/or processes employed in other embodiments is omitted.

At 510, a primary connection can be established by a user equipment to first network equipment to receive data packets from the data source. At 520, a secondary connection can be established to second network equipment to receive data packets from a data source. At 530, data packets can be received from the secondary connection using first error mitigation. At 540, data packets can be received data packets using second error mitigation selected by access point based on network conditions.

Figure 6:
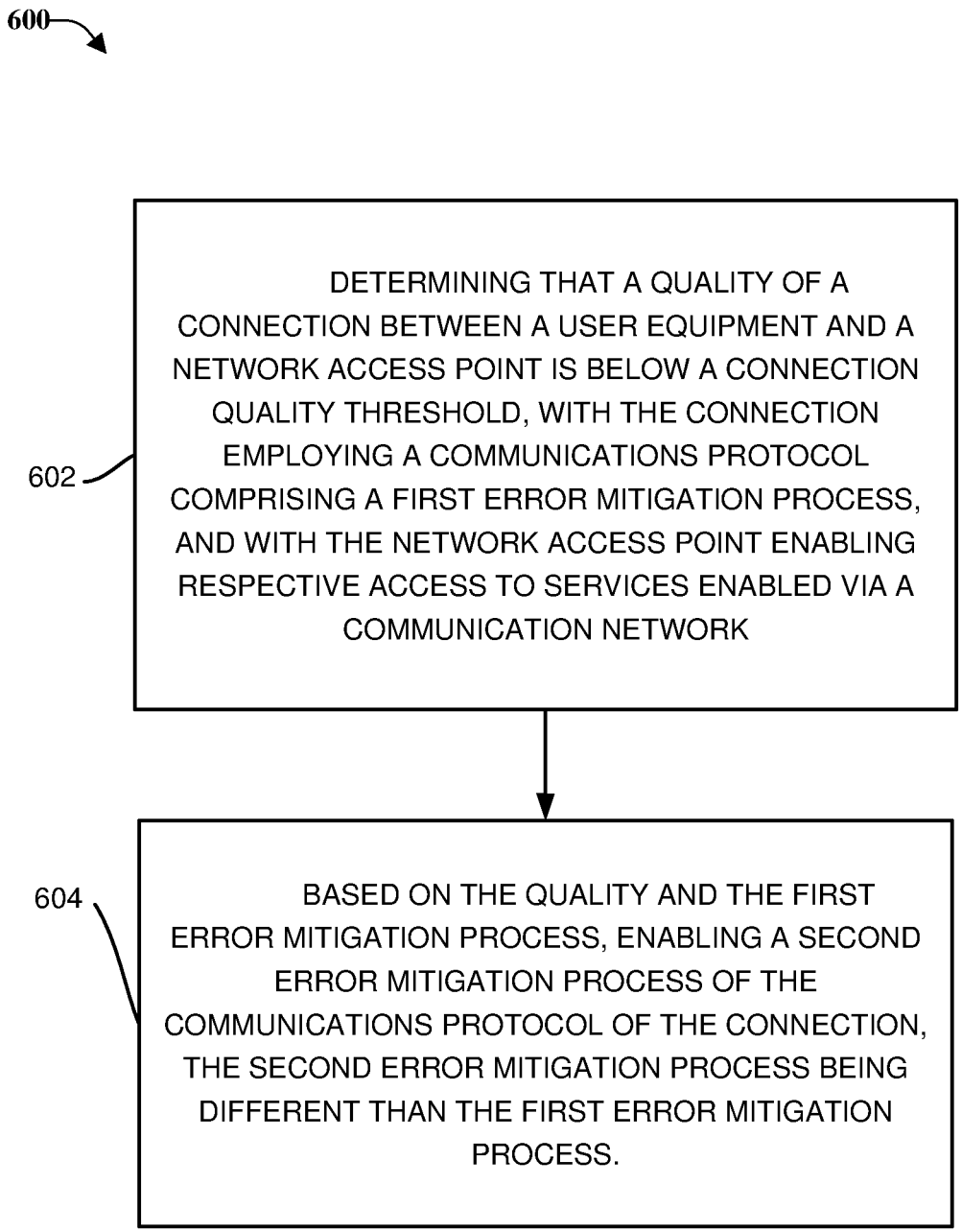
FIG. 6 illustrates an example method that can facilitate changing error mitigation protocols used for a connection based on conditions of a network connection, in accordance with one or more embodiments.

FIG. 6 illustrates an example method 600 that can facilitate changing error mitigation protocols used for a connection based on conditions of a network connection, in accordance with one or more embodiments. For purposes of brevity, description of like elements and/or processes employed in other embodiments is omitted.

At 602, method 600 can include determining that a quality of a connection between a user equipment and a network access point is below a connection quality threshold, wherein the connection employs a communications protocol comprising a first error mitigation process, and wherein the network access point enables respective access to services enabled via a communication network. At 604, method 600 can include, based on the quality and the first error mitigation process, enable a second error mitigation process of the communications protocol of the connection, the second error mitigation process being different than the first error mitigation process.

Figure 7:
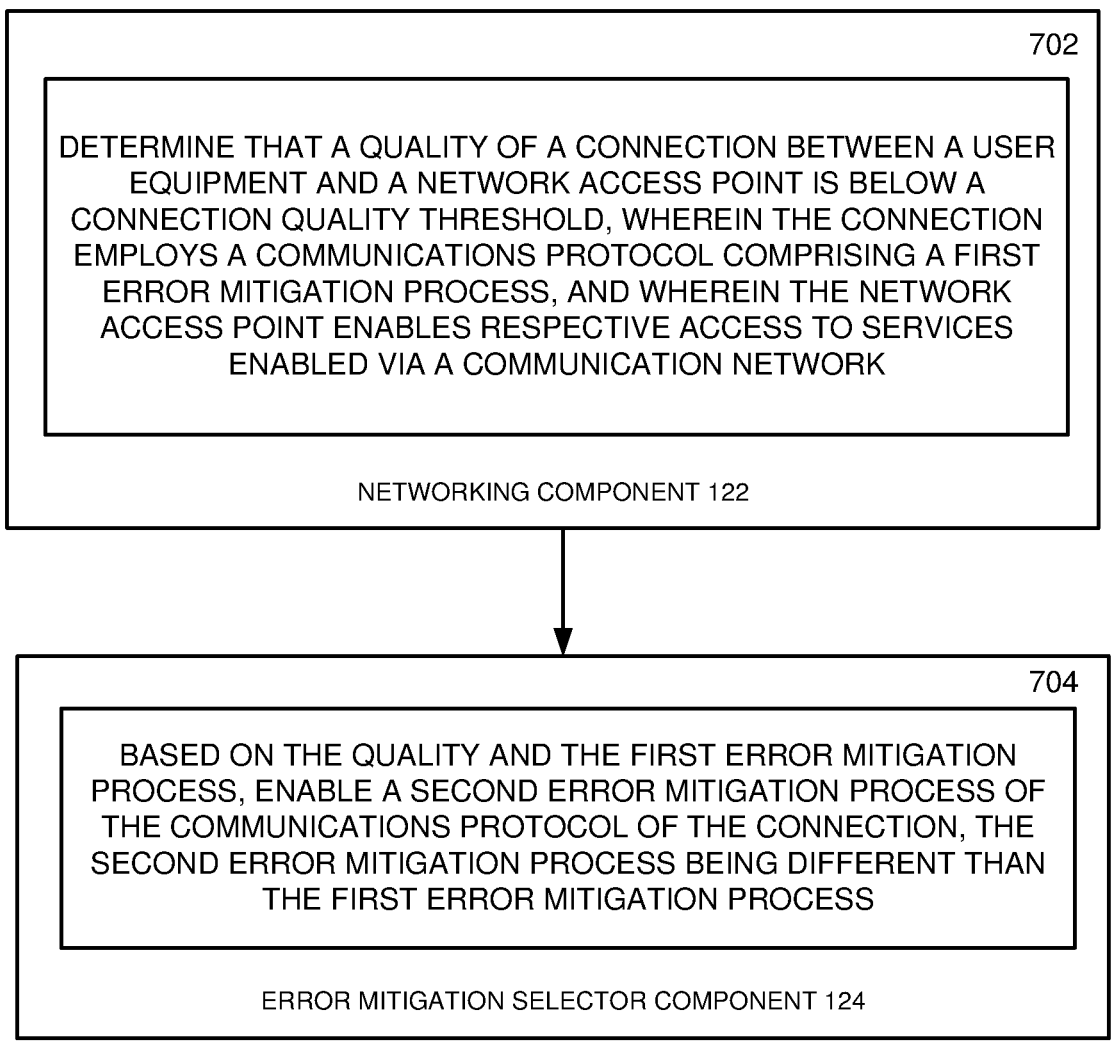
FIG. 7 depicts a system that can facilitate changing error mitigation protocols used for a connection based on conditions of a network connection, in accordance with one or more embodiments.

FIG. 7 depicts a system 700 that can facilitate changing error mitigation protocols used for a connection based on conditions of a network connection, in accordance with one or more embodiments. For purposes of brevity, description of like elements and/or processes employed in other embodiments is omitted. As depicted, system 700 can include networking component 122, error mitigation selector component 124, dual connectivity component 126, and other components described or suggested by different embodiments described herein, that can improve the operation of system 700.

In an example, component 702 can include the functions of networking component 122, supported by the other layers of system 700. For example, component 702 can determine that a quality of a connection between a user equipment and a network access point is below a connection quality threshold, with the connection employing a communications protocol comprising a first error mitigation process, and with the network access point enabling respective access to services enabled via a communication network.

In this and other examples, component 704 can include the functions of error mitigation selector component 124, supported by the other layers of system 700. Continuing this example, in one or more embodiments, component 704 can, based on conditions and the first error mitigation process, enable a second error mitigation process of the communications protocol of the connection, the second error mitigation process being different than the first error mitigation process.

Figure 8:
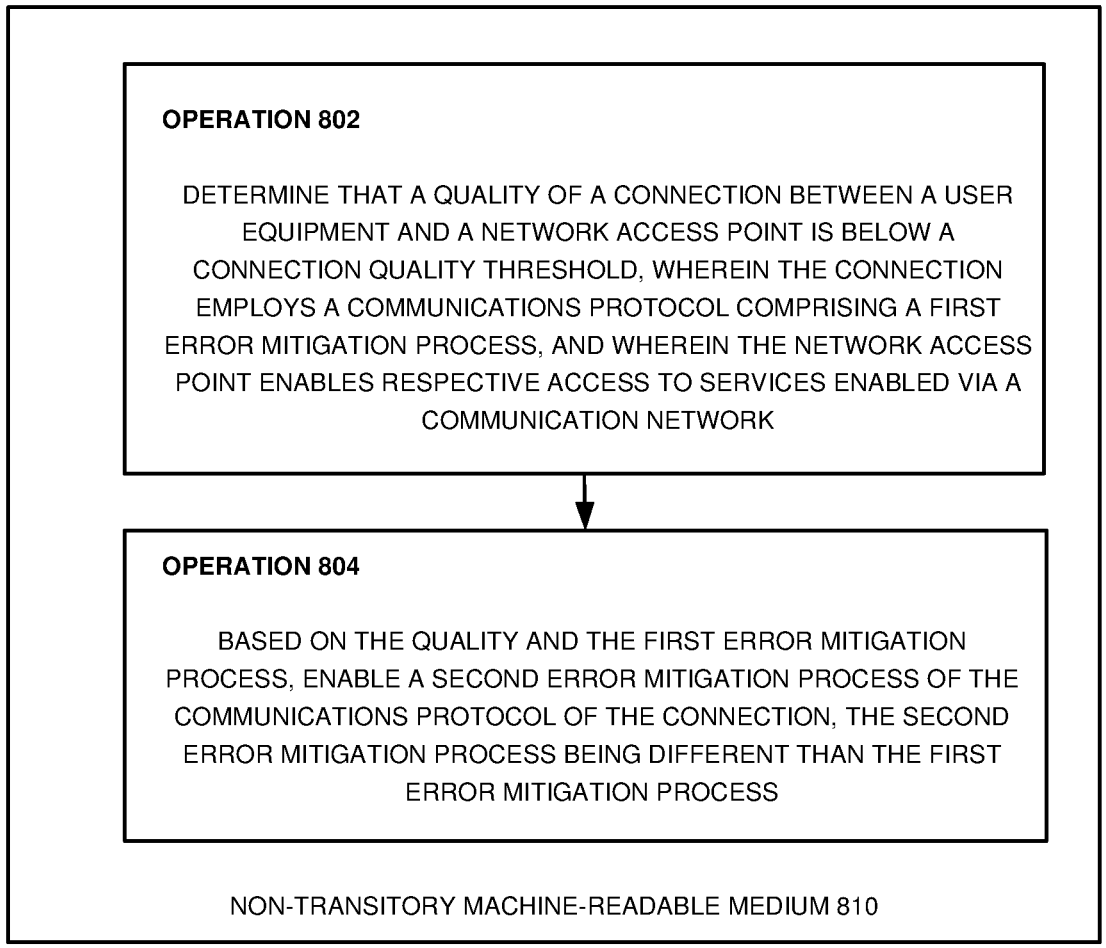
FIG. 8 depicts an example non-transitory machine-readable medium that can include executable instructions that, when executed by a processor of a system, facilitate changing error mitigation protocols used for a connection based on conditions of a network connection, in accordance with one or more embodiments described above.

FIG. 8 depicts an example 800 non-transitory machine-readable medium 810 that can include executable instructions that, when executed by a processor of a system, facilitate changing error mitigation protocols used for a connection based on conditions of a network connection, in accordance with one or more embodiments described above. For purposes of brevity, description of like elements and/or processes employed in other embodiments is omitted. As depicted, non-transitory machine-readable medium 810 includes executable instructions that can facilitate performance of operations 802-804.

In one or more embodiments, the operations can include operation 802 that can determine that a quality of a connection between a user equipment and a network access point is below a connection quality threshold, with the connection employing a communications protocol comprising a first error mitigation process, and with the network access point enabling respective access to services enabled via a communication network. Operations can further include operation 804, that can, based on the quality and the first error mitigation process, enable a second error mitigation process of the communications protocol of the connection, the second error mitigation process being different than the first error mitigation process.

Figure 9:
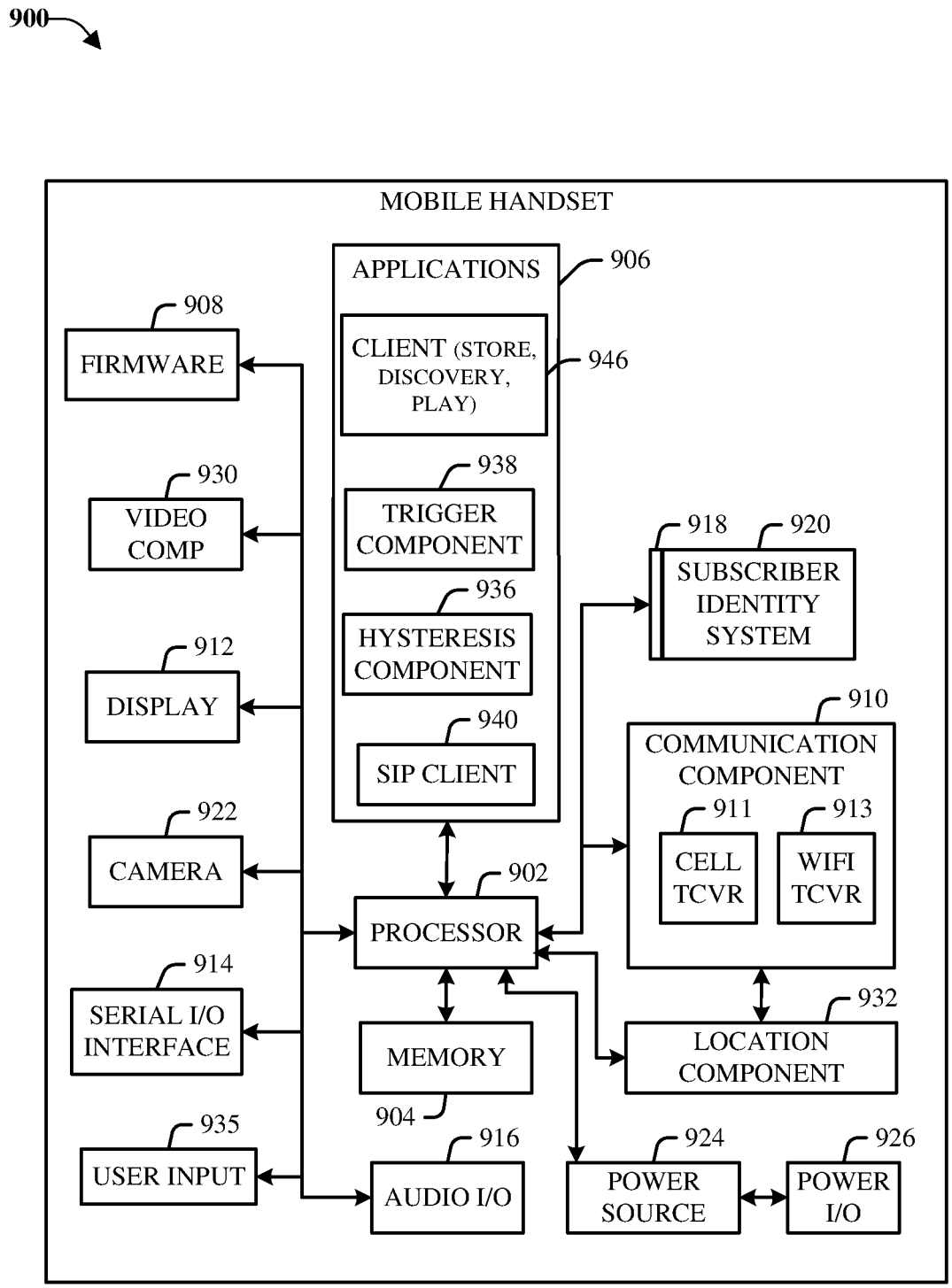
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
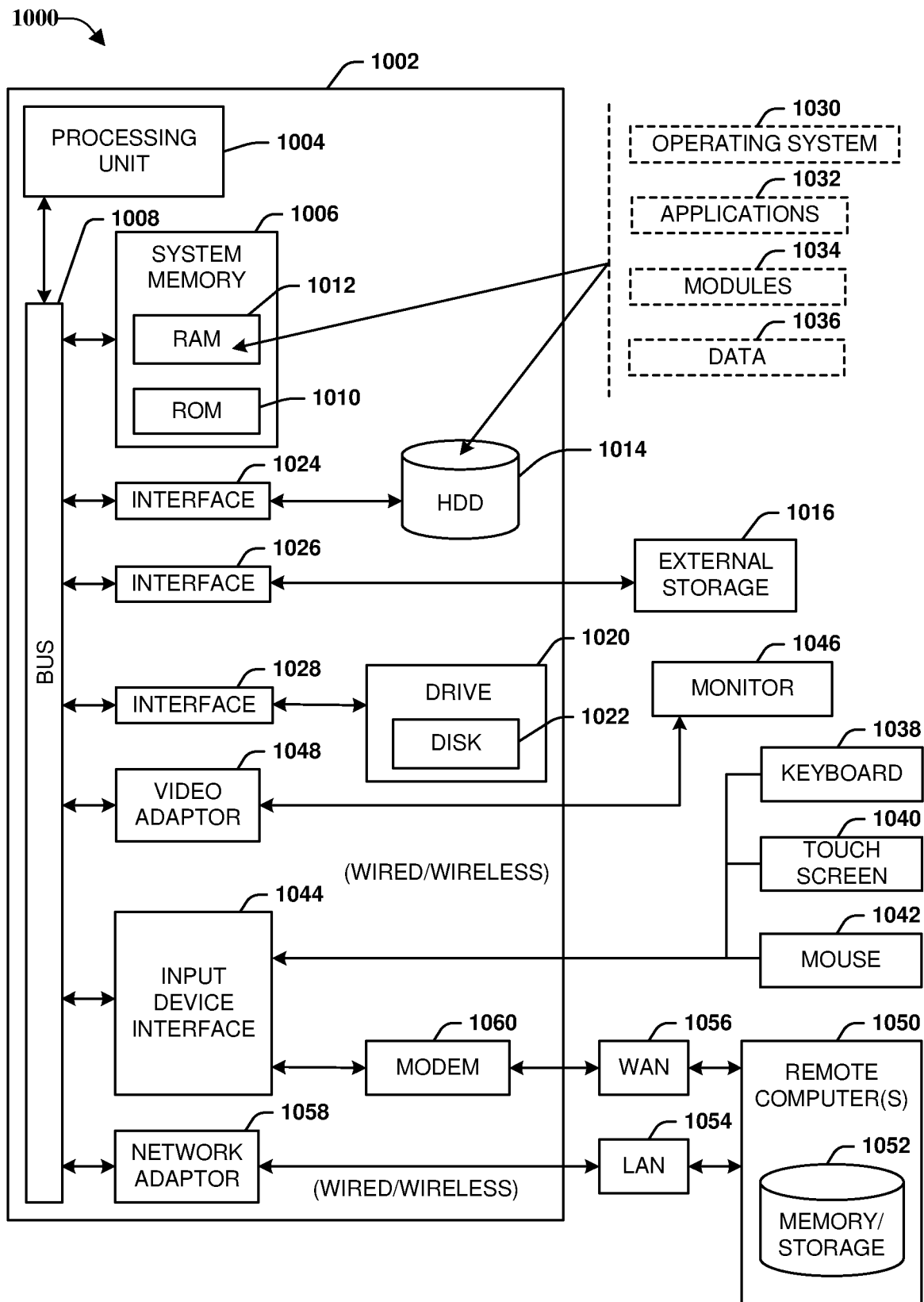
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s)

1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
   determining, by network equipment comprising a processor, that a quality of a connection between a user equipment and a network access point is below a connection quality threshold, wherein the connection employs a communications protocol comprising a first error mitigation process, wherein the network access point enables respective access to services enabled via a communication network, wherein the first error mitigation process is performed at an open systems interconnection physical layer of the communications network, and wherein the first error mitigation process comprises a retransmission of unacknowledged packets; and
   based on the quality and the first error mitigation process, enabling, by the network equipment, a second error mitigation process of the communications protocol of the connection, the second error mitigation process being different than the first error mitigation process, wherein the second error mitigation process is performed at an open systems interconnection layer of the communications network above the open systems interconnection physical layer, and wherein the second error mitigation process comprises a linear coding of packets.

2. The method of claim 1, wherein the user equipment comprises a capability for dual connectivity, wherein before establishing the connection, the user equipment established a primary connection to use the services enabled via the communication network, and wherein the connection comprises a secondary connection to use the services enabled via the communication network, that was established in accordance with a dual connectivity protocol.

3. The method of claim 2, wherein enabling the second error mitigation process is further based on a determination that the primary connection and the secondary connection are being used to communicate data by employing the communications protocol.

4. The method of claim 1, wherein the communications protocol comprises a transmission control protocol.

5. The method of claim 1, further comprising, further based on the quality and the first error mitigation process, masking, by the network equipment, use of the first error mitigation process according to the communications protocol while the second error mitigation process is being employed.

6. The method of claim 1, further comprising, estimating, by the network equipment, a delay caused by use of the first error mitigation process, wherein a compensation factor is determined based on the delay, and wherein enabling the second error mitigation process comprises enabling use of the second error mitigation process to an extent estimated to mitigate the delay based on the compensation factor.

7. The method of claim 6, wherein the delay is estimated based on hybrid automatic repeat request retransmission data information received from the network access point.

8. The method of claim 6, wherein the delay is estimated based on information associated with the communications protocol received from a source of data of the connection.

9. The method of claim 8, wherein the source of the data comprises a transmission control protocol server.

10. A system, comprising:
a processor; and
a memory that stores executable instructions that, when executed by the processor, facilitate performance of operations, comprising:
  determining that a quality of a connection between a user equipment and base station equipment is below a connection quality threshold, wherein the connection employs a communications protocol comprising a first error mitigation process, wherein the base station equipment enables respective access to services enabled via a communication network, wherein the first error mitigation process is performed at an open systems interconnection physical layer of the communications network, and wherein the first error mitigation process comprises a retransmission of unacknowledged packets; and
  based on the quality and the first error mitigation process, enabling a second error mitigation process of the communications protocol of the connection, the second error mitigation process being different than the first error mitigation process, wherein the second error mitigation process is performed at an open systems interconnection layer of the communications network above the open systems interconnection physical layer, and wherein the second error mitigation process comprises a linear coding of packets.

11. The system of claim 10, wherein the user equipment comprises a capability for dual connectivity using a dual connectivity protocol, wherein, before establishing the connection, the user equipment established a primary connection to use the services enabled via the communication network, and wherein the connection comprises a secondary connection to use the services enabled via the communication network, that was established in accordance with the dual connectivity protocol.

12. The system of claim 11, wherein enabling the second error mitigation process is further based on a determination that the primary connection and the secondary connection are being used to communicate data by employing the communications protocol.

13. The system of claim 10, wherein the communications protocol comprises a transmission control protocol.

14. The system of claim 10, wherein the operations further comprise, further based on the quality and the first error mitigation process, masking, by the network equipment, use of the first error mitigation process according to the communications protocol while the second error mitigation process is being employed.

15. The system of claim 10, wherein the operations further comprise, estimating, by the network equipment, a delay caused by use of the first error mitigation process, wherein a compensation factor is determined based on the delay, and wherein enabling the second error mitigation process comprises enabling use of the second error mitigation process to an extent estimated to mitigate the delay as a result of applying the compensation factor.

16. A non-transitory machine-readable medium, comprising executable instructions that, when executed by a processor of network equipment, facilitate performance of operations, comprising:
  determining that a quality of a connection between a user equipment and a network access point does not satisfy a connection quality threshold, wherein the connection employs a communications protocol comprising a first error mitigation process, wherein the network access point enables respective access to services enabled via a communication network, wherein the first error mitigation process is performed at a physical layer of the communications network, and wherein the first error mitigation process comprises a retransmission of unacknowledged packets; and
  based on the quality and the first error mitigation process, enabling a second error mitigation process of the communications protocol of the connection, the second error mitigation process being different than the first error mitigation process, wherein the second error mitigation process is performed at an open systems interconnection layer of the communications network above the physical layer, and wherein the second error mitigation process comprises a linear coding of packets.

17. The non-transitory machine-readable medium of claim 16, wherein the operations further comprise, further based on the quality and the first error mitigation process, masking, by the network equipment, use of the first error mitigation process according to the communications protocol while the second error mitigation process is being employed.

18. The non-transitory machine-readable medium of claim 16, wherein the operations further comprise, estimating a delay caused by use of the first error mitigation process, wherein the operations further comprise determining a compensation factor based on the delay, and wherein enabling the second error mitigation process comprises applying the compensation factor to mitigate the delay.

19. The non-transitory machine-readable medium of claim 18, wherein the delay is estimated based on hybrid automatic repeat request retransmission data information received from the network access point.

20. The non-transitory machine-readable medium of claim 18, wherein the delay is estimated based on information associated with the communications protocol received from a source of data of the connection.

* * * * *